US 12,463,337 B2

(12) United States Patent
Kher et al.

(10) Patent No.: US 12,463,337 B2
(45) Date of Patent: *Nov. 4, 2025

(54) BULK REMOTE ELECTRONIC TILT TOOL AND GRAPHICAL USER INTERFACE

(71) Applicant: DISH Wireless L.L.C., Englewood, CO (US)

(72) Inventors: Pradipbhai Kher, Dublin, OH (US); Christopher Ivin, Powell, OH (US)

(73) Assignee: DISH Wireless L.L.C., Englewood, CO (US)

( * ) Notice: Subject to any disclaimer, the term of this patent is extended or adjusted under 35 U.S.C. 154(b) by 24 days.

This patent is subject to a terminal disclaimer.

(21) Appl. No.: 18/401,035

(22) Filed: Dec. 29, 2023

(65) Prior Publication Data

US 2024/0222860 A1    Jul. 4, 2024

Related U.S. Application Data

(63) Continuation of application No. 18/092,114, filed on Dec. 30, 2022, now Pat. No. 11,901,643.

(51) Int. Cl.
*H01Q 3/00* (2006.01)
*H01Q 3/02* (2006.01)
*G06F 3/0484* (2022.01)

(52) U.S. Cl.
CPC ............. *H01Q 3/005* (2013.01); *H01Q 3/02* (2013.01); *G06F 3/0484* (2013.01)

(58) Field of Classification Search
None
See application file for complete search history.

(56) References Cited

U.S. PATENT DOCUMENTS

| | | | | |
|---|---|---|---|---|
| 9,986,443 | B1* | 5/2018 | Nolan | H04W 16/18 |
| 11,487,643 | B1* | 11/2022 | Bade | G06F 11/3698 |
| 11,800,382 | B1* | 10/2023 | Chandrasekaran | H04W 24/02 |
| 11,901,643 | B1* | 2/2024 | Kher | H01Q 3/02 |
| 2012/0108232 | A1* | 5/2012 | Viering | H04W 16/00 455/424 |
| 2016/0109954 | A1 | 4/2016 | Harris et al. | |
| 2022/0248237 | A1 | 8/2022 | Hu et al. | |

* cited by examiner

*Primary Examiner* — Wilson Lee
(74) *Attorney, Agent, or Firm* — Kipman T. Werking; Frontier IP Law PLLC

(57) ABSTRACT

A disclosed method may include (i) receiving multiple Remote Electrical Tilt related commands that are directed to different respective antennas, (ii) aggregating the multiple Remote Electrical Tilt related commands together as a batch, and (iii) executing a script to issue the multiple Remote Electrical Tilt related commands as the batch such that the multiple Remote Electrical Tilt related commands are applied to the different respective antennas. Related systems and computer-readable mediums are further disclosed.

18 Claims, 13 Drawing Sheets

1202 —

[{"aid-port-id":"0","aid-port-name":"Aid-Port-0","hdlc-address":1,"antenna-unit-number":1,"device-type":"Single-Antenna RET","vendor-code":"CC","unique-id":"CC21110866522857-R1","product-number":"R2000 JMARETSYS","software-version":" FW_V1.0.3","hardware-version":" HW_R2000_A","sector-id":"GAMMA POSITION 1 LOW BAND","installation-date":"091721","installer-id":"SITEX","base-station-id":"CVCLE00053A","antenna-bearing":240.000000,"mechanical-tilt":0.000000,"frequency-band":[5;12;13;14;19],"antenna-serial-number":"MX08665212211854","antenna-model-number":"MX086652040 1AR1","max-tilt":14.000000,"min-tilt":-2.000000,"current-tilt":6.000000,"alarms-status":[{"alarm-number": 0, "alarm-description": "No active Alarms"}]}]

1204 —

Also an Example of Failed Response: in Status Column

| CMSIP | RUID | Execution ID | Status |
|---|---|---|---|
| 49.224.6.87 | 491024813 | 05b37e38-0a66-323b-9ad2-837db38b0ed7 | [{'Operation-StatusCode': '400', 'Operation-ResponseBody': {'error-message': 'RU is not connected cannot perform RET operation'}, 'error-message': 'RU is not conn du-758999ddcd-nc97d'}] |

1216 —

[{'Operation-StatusCode': '400', 'Operation-ResponseBody': {'error-message': 'RU is not connected cannot perform RET operation'}; 'NFServiceInstance': 'mvmicil;NetworkFunction=121013008;NFService=du-758999ddcd-nc97d'}]

*FIG. 12*

BULK REMOTE ELECTRONIC TILT TOOL AND GRAPHICAL USER INTERFACE

BRIEF SUMMARY

This application is generally directed to Remote Electronic Tilt commands and a corresponding graphical user interface. In one illustrative example, a method may include receiving multiple Remote Electrical Tilt related commands that are directed to different respective antennas, aggregating the multiple Remote Electrical Tilt related commands together as a batch, and executing a script to issue the multiple Remote Electrical Tilt related commands as the batch such that the multiple Remote Electrical Tilt related commands are applied to the different respective antennas.

In some examples, the multiple Remote Electrical Tilt related commands have the same command type that is one of: a command type to retrieve response information in bulk for all radio units within a set, a command type to retrieve response information in bulk for specific previous executions of commands, a command type to calibrate radio units in bulk, a command type to set antennas tilt orientation in bulk, a command type to set an antenna sector identifier in bulk, a command type to set a base station identifier in bulk, a command type to set an installation date in bulk, a command type to set an installer identifier in bulk, a command type to set a mechanical tilt in bulk, and a command type to set an antenna bearing in bulk.

In some examples, the command type accepts as inputs a configuration management system Internet Protocol address and a radio unit identifier. In some examples, the command type further accepts as an input an identifier of a previous execution of a Remote Electrical Tilt related command.

In some examples, the command type further accepts as an input a port number, a HDLC address, and an antenna unit identifier. In some examples, the command type further accepts as an input a tilt value.

In some examples, the method further includes detecting that executing the script to issue the multiple Remote Electrical Tilt related commands as the batch failed to produce a response for at least two of the multiple Remote Electrical Tilt related commands. In further examples, the method further includes issuing a second set of multiple Remote Electrical Tilt related commands as a second batch to target radio units corresponding to the at least two of the multiple Remote Electrical Tilt related commands. The method may also further include issuing Remote Electrical Tilt related commands iteratively until all targeted radio units produce a response.

In some examples, the script accepts as input a spreadsheet and produces responsive output into a row or column of the spreadsheet.

A corresponding non-transitory computer-readable medium is also further disclosed. Similarly, a corresponding system may include a radio unit, a configuration management system operable to adjust an antenna tilt at the radio unit, and a scripting application interfacing with the configuration management system. The scripting application can be configured to execute the method outlined above and discussed in more detail below.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIGS. 11-12 show more comprehensive examples of Remote Electrical Tilt commands and responses.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
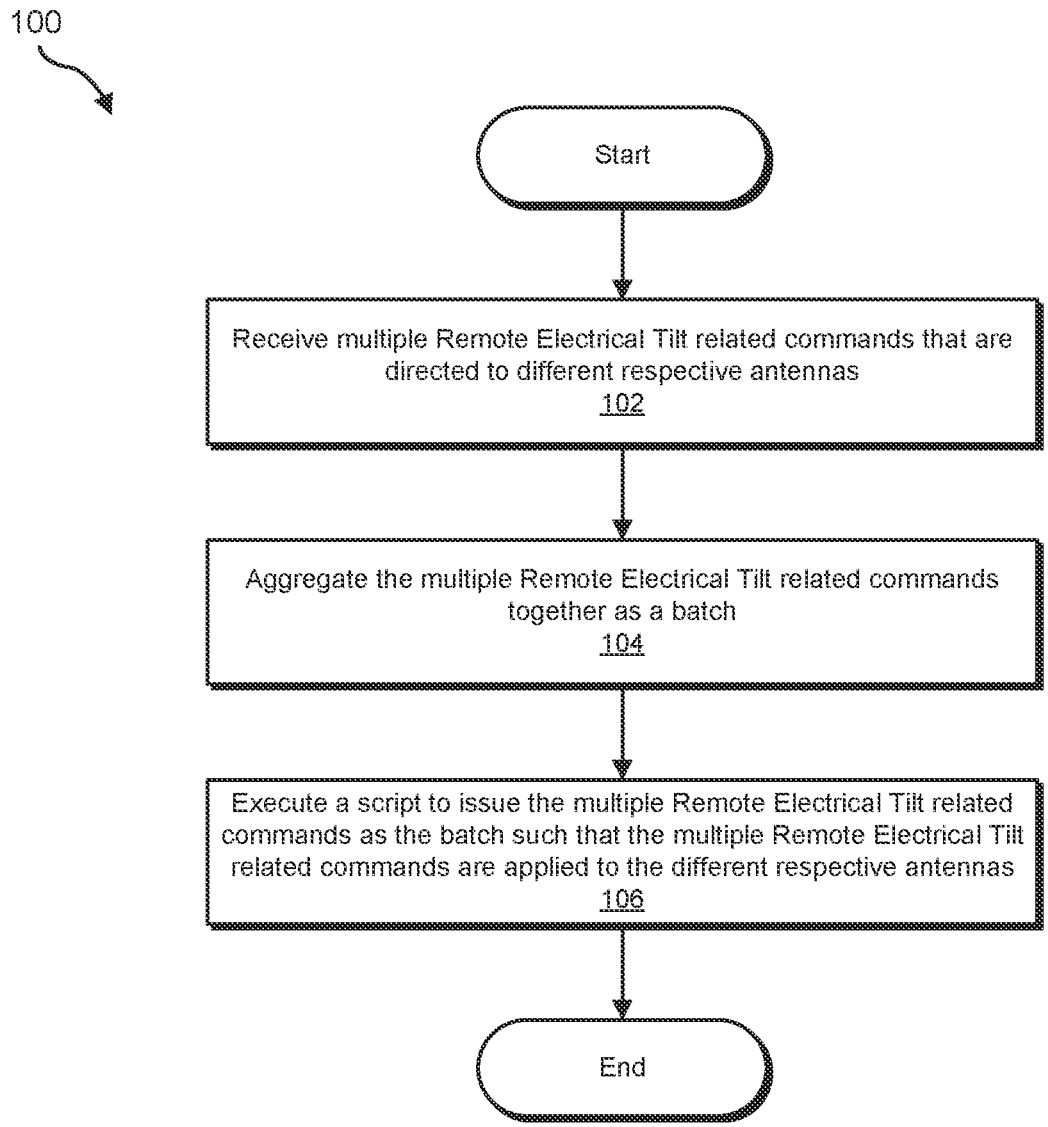
FIG. 1 shows a flow diagram corresponding to an example method for executing Remote Electrical Tilt commands in bulk.

FIG. 1 shows a flow diagram for an example method 100 for executing Remote Electrical Tilt commands in bulk. At step 102, one or more of the systems described herein may receive multiple Remote Electrical Tilt related commands that are directed to different respective antennas. At step 104, one or more of the systems described herein may aggregate the multiple Remote Electrical Tilt related commands together as a batch. Lastly, at step 106, one or more of the systems described herein may execute a script to issue the multiple Remote Electrical Tilt related commands as a batch such that the multiple Remote Electrical Tilt related commands are applied to the different respective antennas.

As used herein, the term "Remote Electrical Tilt related commands" can refer to antenna-specific commands for adjusting the tilt of a corresponding antenna at a radio unit within a cellular base station. The adjectives "remote" and "electrical" help to clarify that these commands can be performed remotely through electrical instructions, as distinct from mechanical tilt modifications. In some examples, these commands may be formatted according to a communication standard known as Antenna Interface Standards Group (AISG).

The adjective "related" helps to clarify that such commands include commands to directly alter or modify the tilt of a corresponding antenna, as well as antenna-specific commands that indirectly facilitate the modification and maintenance of a correct or desired antenna tilt, including especially the various commands discussed below in the context of FIGS. 2-10. Moreover, the adjective "antenna-specific" helps to distinguish these commands from more general purpose computer instructions that only facilitate antenna tilt modifications in a more tenuous manner (e.g., a command to turn a computer on or off).

Generally speaking, modern cellular panel antennas are equipped with an ability to adjust a coverage footprint by utilizing an electrical motor to physically adjust antenna elements. This system is known as "Remote Electrical Tilt (RET)." A radio access network (RAN) vendor's element management platform will communicate to the antennas on site and send the corresponding commands (e.g., AISG commands) to complete functions to read and write antenna tilt values. Certain vendors may provide a configuration management system that allows users to adjust the tilt of each antenna. Nevertheless, one deficiency or suboptimization of the configuration management system can be that the configuration management system only enables individual single site adjustment at a time, which can be addressed by one or more of the example methods and solutions described in this application. In particular, this application discloses a solution that enables the adjusting of multiple antenna tilt values using multiple Remote Electrical Tilt commands at once, simultaneously, or in a batch process, as discussed in more detail below. Accordingly, users can provide a list of radio units, antennas, etc., and corresponding Remote Electrical Tilt commands, to thereby adjust the respective tilt values for these antennas. Moreover, as discussed in further detail below in connection with FIGS. 2-10, this application also discloses that other Remote Electrical Tilt related commands, such as discovery and calibration commands, can be performed in a parallel or analogous manner in a batch mode.

In various embodiments, the solution of this application may provide a number of different features or benefits that improve upon related technology. In particular, this application discloses a software implementation that provides individual and more granular user account logins and a corresponding historic record of user-specific instructions (see FIG. 2). The ability to execute commands in bulk allows for rapid optimization and overall time-saving across an entire market. These commands may include commands to directly alter or adjust the tilt of a corresponding antenna at a radio unit, as well as more indirectly related calibration and setting commands. Moreover, this application discloses multiple example embodiments of process flows or troubleshooting procedures, which further enhance the benefits and improvements of this tool (see FIGS. 3 and 7).

Figure 2:
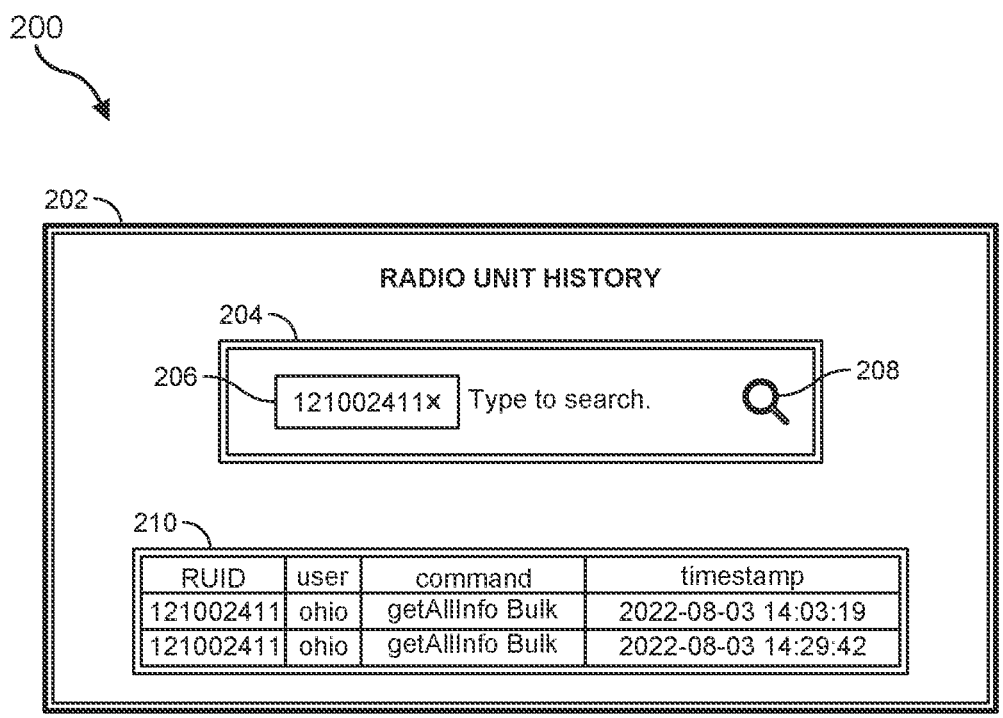
FIG. 2 shows an example graphical user interface for searching for, and retrieving, a user history in connection with a configuration management system.

FIG. 2 shows an example graphical user interface 200, including a primary window 202, that facilitates the retrieval of a radio unit history, while further demonstrating the benefits of user-specific command recording and archiving. As further shown in this figure, primary window 202 may further include a window 204, a search button 208, and an input element 206. Input element 206 may be configured to accept an identifier for a radio unit at a cellular base station. Accordingly, a user at graphical user interface 200 may enter such an identifier (e.g., "121002441" in this example figure), and then toggle search button 208, which can produce a table or history 210. As further shown in this figure, a specific user account (e.g., with username "ohio" in this example) is revealed to have executed two instances of a specific command (e.g., "getAllInfo Bulk", as discussed in more detail below in connection with FIG. 5). Moreover, the timestamp column of table 210 further identifies the specific dates and times at which the specific historical commands were executed.

The technology of FIG. 2 helps improve upon non-user-specific configuration management systems, which may only have provided a single effective user account to a vendor (e.g., such as Dish Network) seeking to interface with the configuration management system. The single, generic user account thereby effectively obscured which particular user might have executed a particular command at a particular date and time. Accordingly, the technology of FIG. 2 helps to facilitate troubleshooting with more specificity regarding which specific users executed particular historical Remote Electrical Tilt related commands.

Figure 3:
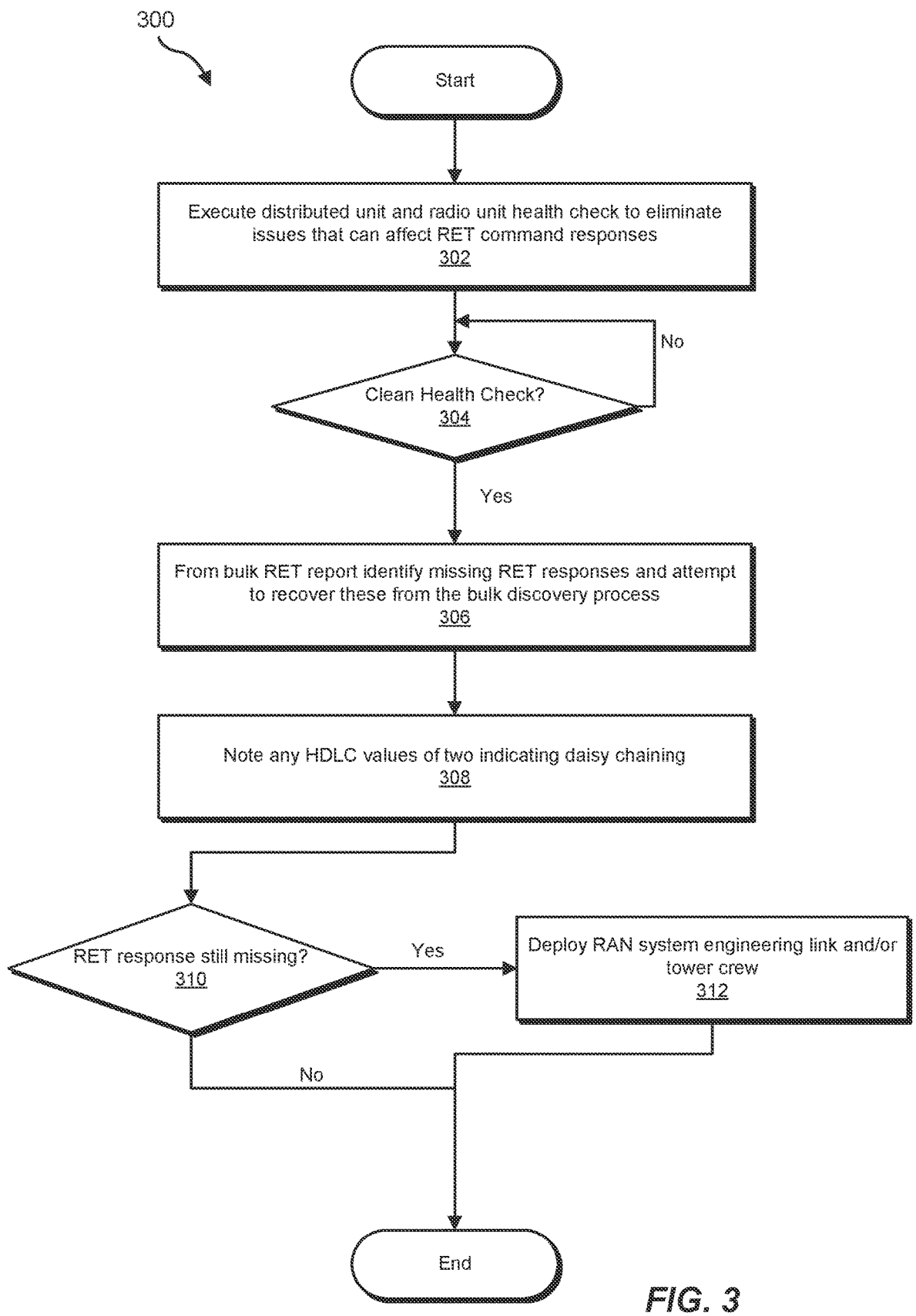
FIG. 3 shows a flow diagram corresponding to an example method for troubleshooting Remote Electrical Tilt commands when executed in bulk.

FIG. 3 shows a flow diagram for an example method 300 for troubleshooting the execution of multiple Remote Electrical Tilt related commands. Accordingly, method 300 can be performed in coordination or conjunction with the batch or bulk execution of such commands, as discussed below further in connection with FIGS. 4-10, for example.

At step 302, one or more of the systems described herein can first execute a distributed unit and/or radio unit health check to eliminate possible issues that might affect Remote Electrical Tilt related command responses. At decision step 304, method 300 may repeatedly iterate until these health checks report back a clean indication of health at the distributed unit and/or radio unit.

At step 304, from the bulk Remote Electrical Tilt report received in response to the bulk commands, one or more of the systems described herein may identify missing responses. Accordingly, the non-responsive antennas may be further pinged in a more granular or selective manner using a specific "GetStatus" command, as discussed in more detail below in connection with FIG. 6. Furthermore, at step 308, one or more of the systems described herein may note any High-Level Data Link Control (HDLC) values of two, which may indicate a problem associated with daisy chaining. Daisy chaining can refer to a process by which devices are interconnected in series one after the other, and this process can result in individual devices not being addressable individually (e.g., because the devices are interconnected serially from one device to another).

Lastly, at a decision step 310, a determination can be made of whether a Remote Electrical Tilt command is still not producing a response, even after the execution of the GetAllInfo command (see FIG. 5), and even after the successful passing of the distributed unit and radio unit health checks. In this case, at step 312, it may be appropriate to refer to a RAN system engineering link for Remote Electrical Tilt command failure scenarios. Additionally, or alternatively, it may be appropriate to deploy a tower crew in order to investigate replacing one or more Remote Electrical Tilt cables.

Figure 4:
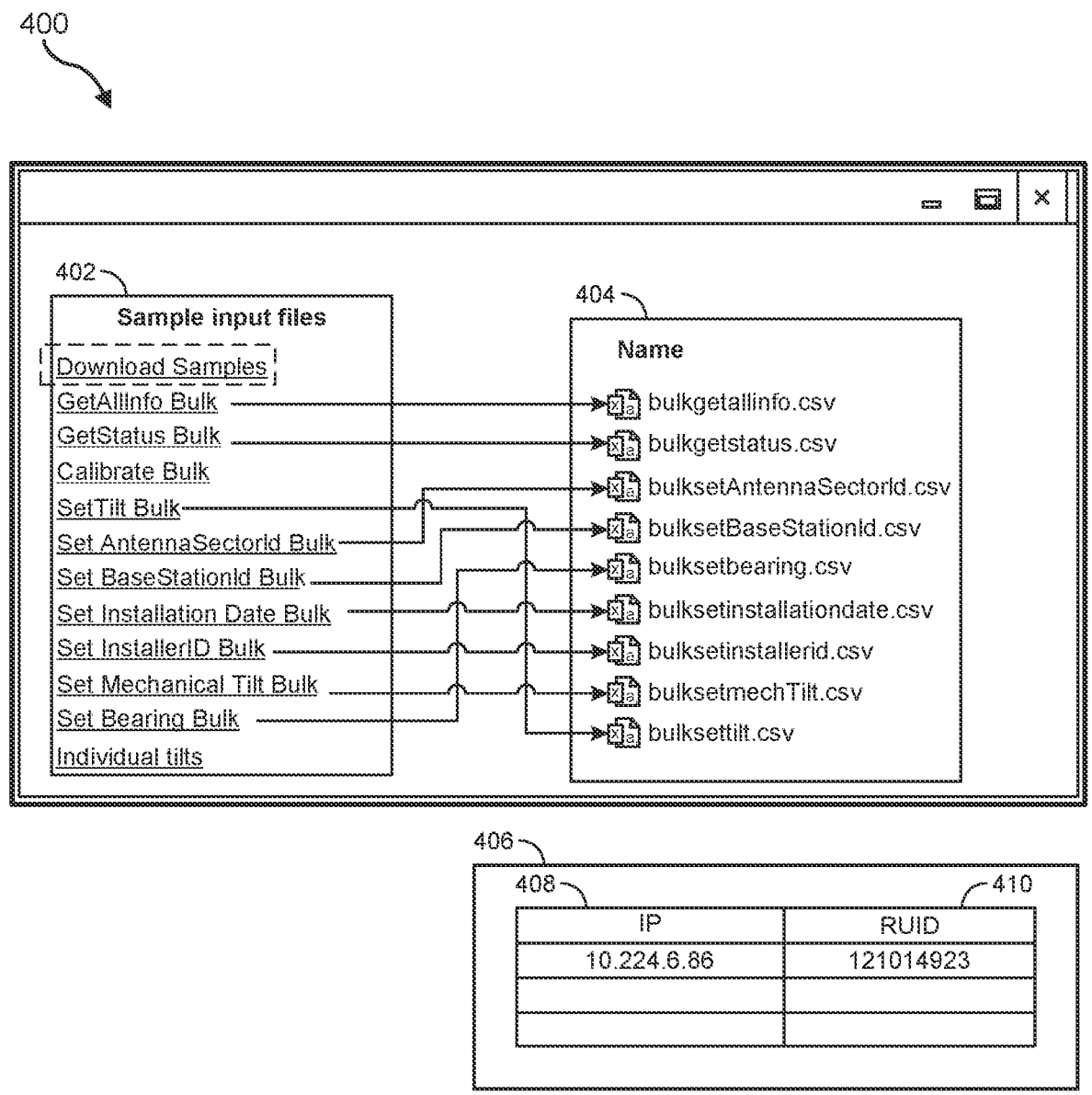
FIG. 4 shows a diagram illustrating the example of input files that can be used to execute Remote Electrical Tilt commands in bulk.

FIG. 4 shows an illustrative diagram of links 402 within a graphical user interface 400, which may correspond to specific spreadsheet input files 404. In this illustrative example, spreadsheet input files 404 are configured as spreadsheets or comma separated values files. Nevertheless, in additional or alternative embodiments, the relevant input information may be stored or formatted in any suitable file, database, or other data structure. Accordingly, the example of spreadsheets or comma separated values files is used in this figure for illustrative purposes only.

As further shown in FIG. 4, links 402 and/or corresponding spreadsheet input files 404 may respectively match different Remote Electrical Tilt related commands that can be performed in bulk (e.g., by a scripting application, which can interface with a configuration management system) and corresponding antennas, as further discussed above. These commands may include a command type to retrieve response information in bulk for all radio units within a set ("GetAllInfo Bulk"), a command type to retrieve response information in bulk for specific previous executions of commands ("GetStatus Bulk"), a command type to calibrate radio units in bulk (CSV file not shown in this example, but see FIG. 8), a command type to set antennas tilt orientation in bulk ("SetTilt Bulk"), a command type to set an antenna sector identifier in bulk ("Set AntennaSectorId Bulk"), a command type to set a base station identifier in bulk ("Set BaseStationId Bulk"), a command type to set an installation date in bulk ("Set Installation Date Bulk"), a command type to set an installer identifier in bulk ("Set InstallerID Bulk"), a command type to set a mechanical tilt in bulk ("Set Mechanical Tilt Bulk"), and a command type to set an antenna bearing in bulk ("Set Bearing Bulk"). Moreover, as used herein, the term "bulk" can generally refer to a set of at least two instances of commands, including potentially large multitudes of commands, consistent with the discussion of FIGS. 2-10.

FIG. 4 also includes a helpful table 406, which specifies a column 408 for an Internet protocol address and specifies a column 410 for a radio unit identifier. The Internet protocol address corresponds to the active Internet protocol address of the configuration management system, rather than the radio unit Internet protocol address. The usage of the active Internet protocol address of the configuration management system is due to the fact that the script or other software application, performing method 100 will generally be searching for the hosting configuration management system that has those specific radio units attached (see column 410 in FIG. 4). In various embodiments, one or more of the command types shown in FIG. 4 (e.g., each of these command types) may accept as inputs the configuration management system Internet Protocol address and the radio unit identifier, as shown in table 406.

Figure 5:
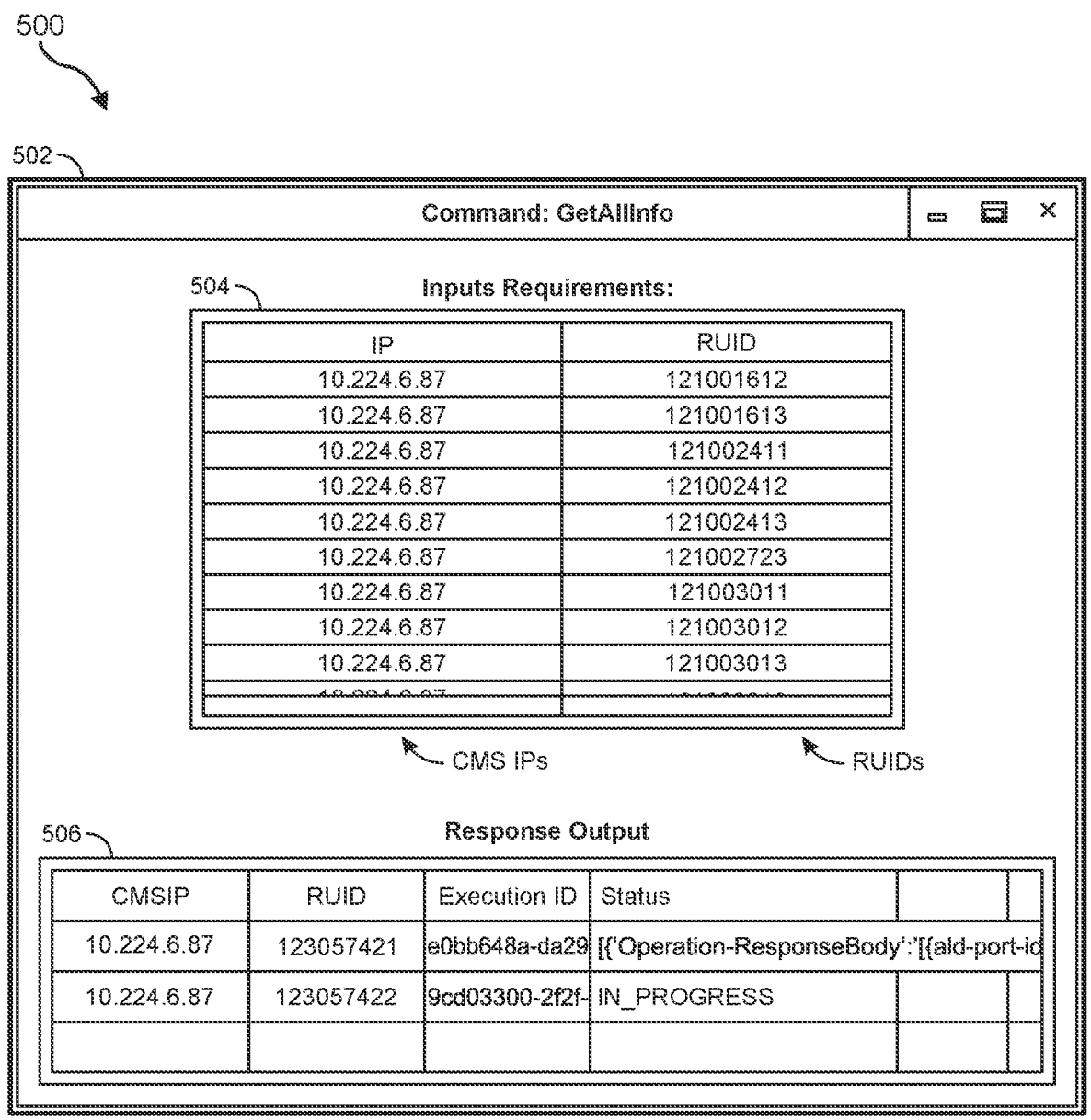
FIG. 5 shows an example graphical user interface for retrieving information in bulk for a set of radio units corresponding to a single configuration management system.

FIG. 5 shows an illustrative graphical user interface 500, including a primary window 502, which corresponds to execution of the "GetAllInfo" command. As distinct from a more granular or selective request for responsive information (see FIG. 6), this particular command may seek information regarding each radio unit within a set of radio units for a particular marketplace (e.g., a particular state within the United States). This particular command may accept as inputs the single Internet protocol address for the configuration management system covering that particular geographic location (e.g., a particular state such as Utah, which may be covered by a single configuration management system and corresponding active Internet protocol address), as well as the radio unit identifiers for all of the corresponding radio units within the set. These inputs are listed within window 504, and responsive output is indicated within window 506, as further shown in this figure.

Window 506 further repeats the inputs from window 504 on the left-hand side of the table, but also further includes responsive output columns for a command execution identifier (e.g., a hash of metadata identifying a particular execution instance for a specific command type) and for a status resulting from executing the command. In the illustrative example of window 506, the first row may indicate that, in response to the command execution identified by hash "e0bb648a-da29," responsive metadata has been successfully received at the configuration management system (e.g., "[{'Operation-ResponseBody': '[{ald-port-id" [ . . . ]). In contrast, window 506 also further illustrates how, in response to the command execution identified by hash "9cd03300-2f2f-", a reported status indicates that this particular command is still in the progress of being executed.

In various examples, window 506 may provide responsive output corresponding to each one of the command executions applied at the radio units identified within window 504 over a particular period of time or within predefined parameters. In the simplified example of FIG. 5, this responsive output within window 506 may only indicate two command execution instances, as shown. Generally speaking, the "GetAllInfo" command of FIG. 5 can enable system discovery of Remote Electrical Tilt data, including parameters and historical data regarding previous command executions, such that once the configuration management system has discovered this data, the configuration management system may enable further command executions, as discussed in more detail below in connection with FIGS. 6-10, for example.

Figure 6:
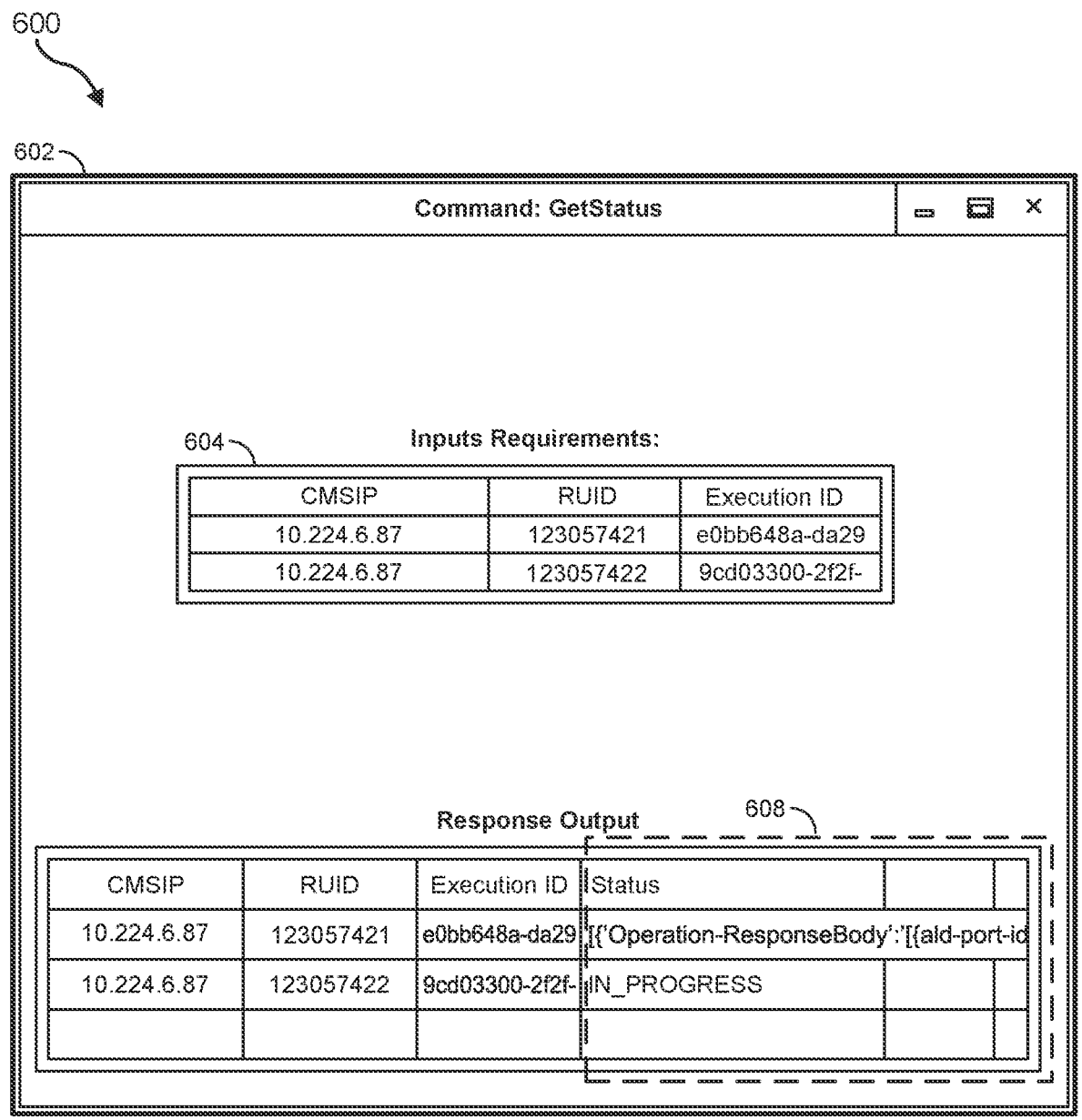
FIG. 6 shows an example graphical user interface for retrieving information more granularly in response to previous executions of one or more Remote Electrical Tilt commands.

FIG. 6 shows a similar graphical user interface 600, including a primary window 602, corresponding to execution of the "GetStatus" command. This graphical user interface and corresponding command are distinguished from the graphical user interface of FIG. 5, due to the more granular or selective inputs that specify not just the command management system Internet protocol address and radio unit identifier, but also the execution identifier (e.g., hash) for particular instances of historically executed commands at those particular radio units, as shown in a window 604. In other words, this particular command type further accepts as an input an identifier of a previous execution of a Remote Electrical Tilt related command. Thus, as shown in FIG. 6, the inputs within window 604 to enable this command can be much briefer or shorter than the corresponding inputs within window 504 of FIG. 5, which otherwise specified all relevant radio units within the set covered by that particular configuration management system. Thus, the input parameters for the "GetStatus" command can be much more granular or selective than for the "GetAllInfo" command of FIG. 5, and yet the responsive output can operate in substantially the same or parallel manner, as further shown by the status column highlighted by indicator 608 within FIG. 6.

The purpose of the "GetStatus" command of FIG. 6 can be to query the configuration management system for the status of historic issued Remote Electrical Tilt command executions. After a particular Remote Electrical Tilt command is issued to the configuration management system, a response can be received (e.g., sometimes within a minute). The bulk tool commands of this application can allow for a predefined response window (e.g., a one minute window of time). In some scenarios, the majority of commands that are executed will have received a response within that particular timeframe. Nevertheless, there is a chance that a response to a particular command may take more time, especially if there is an issue with the Remote Electrical Tilt configuration. To accommodate this longer timeframe, and to perform troubleshooting, the GetStatus command enables a user or administrator to pull historic responses in a more granular or selective fashion.

As discussed above in connection with FIG. 6, in some scenarios it can be helpful to perform successive manual iterations using the response file until all needed, desired, or appropriate responses have been obtained. Because Remote Electrical Tilt communication might take longer than a predetermined window of time (e.g., a one minute window), iterative usage of the "GetStatus" command enables a user or administrator to query the status of a previously issued command, at a later time, in order to discover what the final response from the radio unit was. In certain examples, the same response file can be used as the input for the "GetStatus" command for each iteration, and the corresponding final column of "status" (see FIG. 6) will be updated each time with the most up-to-date response information. Moreover, this process can be repeatedly performed, in an iterative fashion, until the complete list of responses is successfully obtained (see also the discussion of FIG. 7 below).

Figure 7:
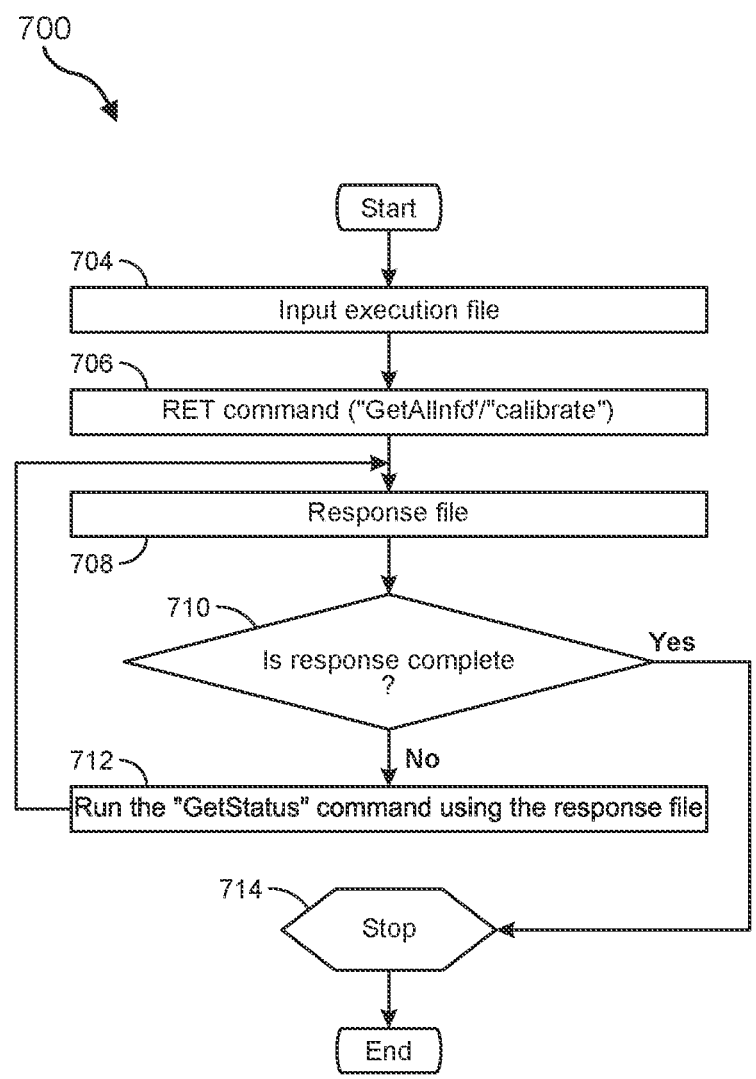
FIG. 7 shows a flow diagram corresponding to an example method for repeatedly and iteratively executing Remote Electrical Tilt commands in bulk.

FIG. 7 shows another flow diagram for a corresponding method 700 for repeatedly and iteratively executing Remote Electrical Tilt related commands, followed by more granular or selective execution of the "GetStatus" command with respect to those previous command executions that fail to report a successful status within the predefined window of time discussed above. Accordingly, method 700 of FIG. 7 is substantially similar to the troubleshooting method 300 of FIG. 3, but with more specific reference to the Remote Electrical Tilt commands discussed above in connection with the graphical user interfaces of FIGS. 5-6.

Beginning at a step 704, a corresponding input execution file, such as one or more of the comma separated files diagramed in FIG. 4, may be input or selected. At step 706, one or more less selective Remote Electrical Tilt related commands may be executed, such as the "GetAllInfo" command (FIG. 5) or the bulk calibration command (see FIG. 8). These less selective commands may produce a relatively larger amount of responsive output information, and yet not all of the radio units may be responsive within the predetermined window of time, as further discussed above. Accordingly, at a step 708, the responsive output file may be produced or received, and at a decision step 710, a determination can be made as to whether the response file is complete (e.g., a determination of whether executing the script to issue the multiple Remote Electrical Tilt related commands as the batch failed to produce a response for one or more Remote Electrical Tilt related commands). If the answer is no at decision step 710, then the more selective or granular Remote Electrical Tilt command type of "GetStatus" (FIG. 6) can be executed with respect to the particular historical command executions that failed to produce a response, thereby producing another response file at a repeated iteration of step 708 consistent with the flow diagram shown in FIG. 7. In other words, a second set of multiple Remote Electrical Tilt related commands (i.e., the "GetStatus" command) can be executed as a second batch to target radio units corresponding to the multiple Remote Electrical Tilt related commands that failed to produce a result.

On the other hand, if the decision is yes at decision step 710, then method 700 may stop at step 714. In this manner, issuing Remote Electrical Tilt related commands can be repeated iteratively until all targeted radio units produce a response. The repeated and iterative nature of method 700 may result in a winnowing down of historical command executions that the solution of this application will follow up on until determining that the response file is complete (or otherwise aborting the attempt, such as by deploying a tower crew at step 312 of method 300).

Figure 8:
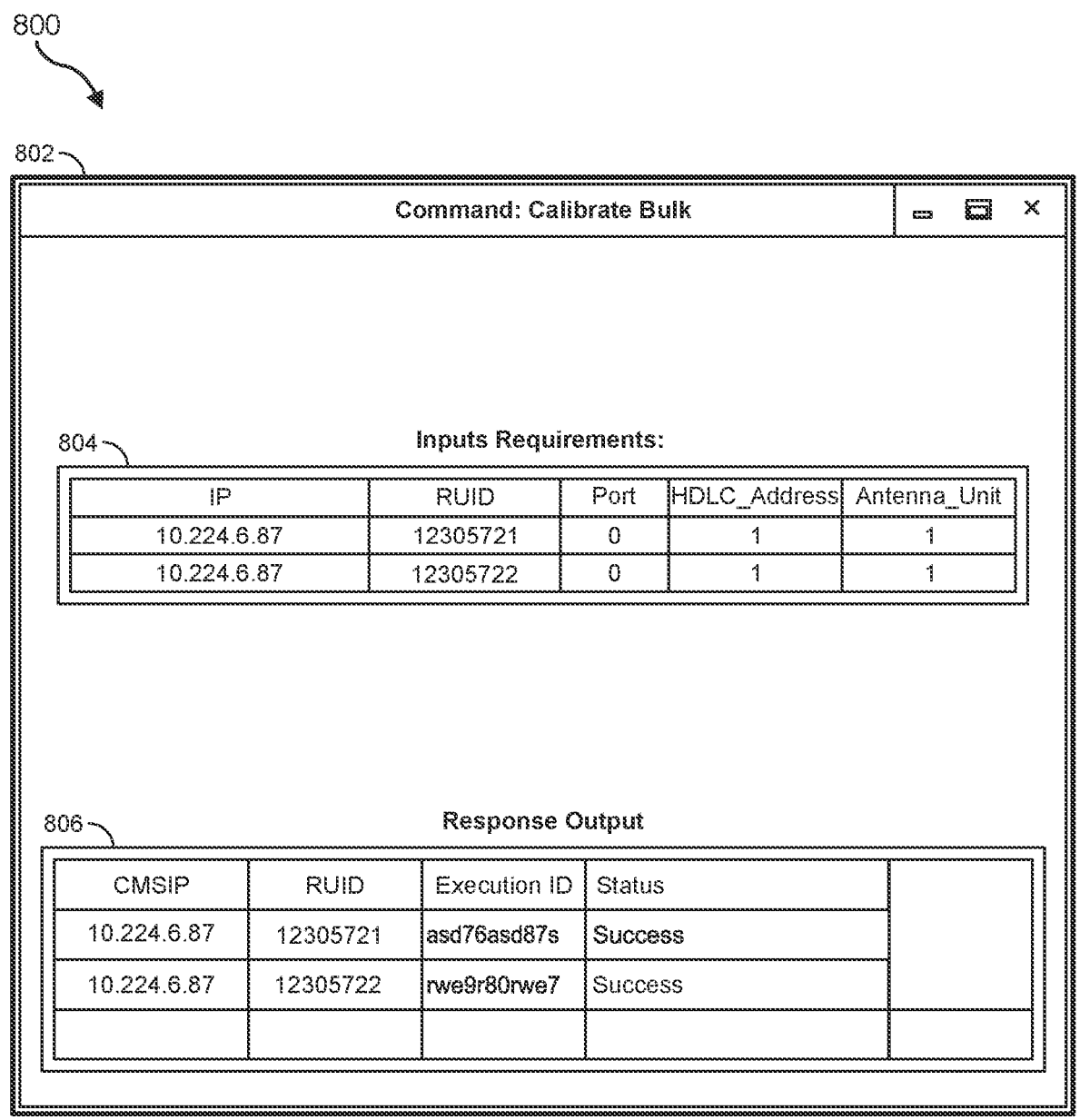
FIG. 8 shows an example graphical user interface for executing a calibration command in bulk.

FIG. 8 shows an example graphical user interface 800, including the primary window 802, that corresponds to the "Calibrate Bulk" Remote Electrical Tilt related command. Calibration can refer to the process of the Remote Electrical Tilt controller performing a full range sweep from a minimum tilt value to a maximum tilt value in order to confirm a full working range of the motor and correct functioning of the Remote Electrical Tilt system. It can be recommended to perform periodic calibrations in order to confirm the full working range of the Remote Electrical Tilt configuration.

As further shown in FIG. 8, this particular command type (i.e., "Calibrate Bulk") can further accept as an input a port number, a HDLC address, and an antenna unit identifier. These are further shown within the additional columns on the right side of a window 804 specifying the inputs for this particular command. Moreover, graphical user interface 800 can further include a window 806 specifying responsive output, including an execution identifier (e.g., a metadata hash) for a corresponding historical command execution, as well as a status indicator. In the illustrated example of this figure, both of these particular historical command executions resulted in success, thereby indicating that the respective antennas fully performed a full range of adjustment between the minimum tilt value and the maximum tilt value.

Figure 9:
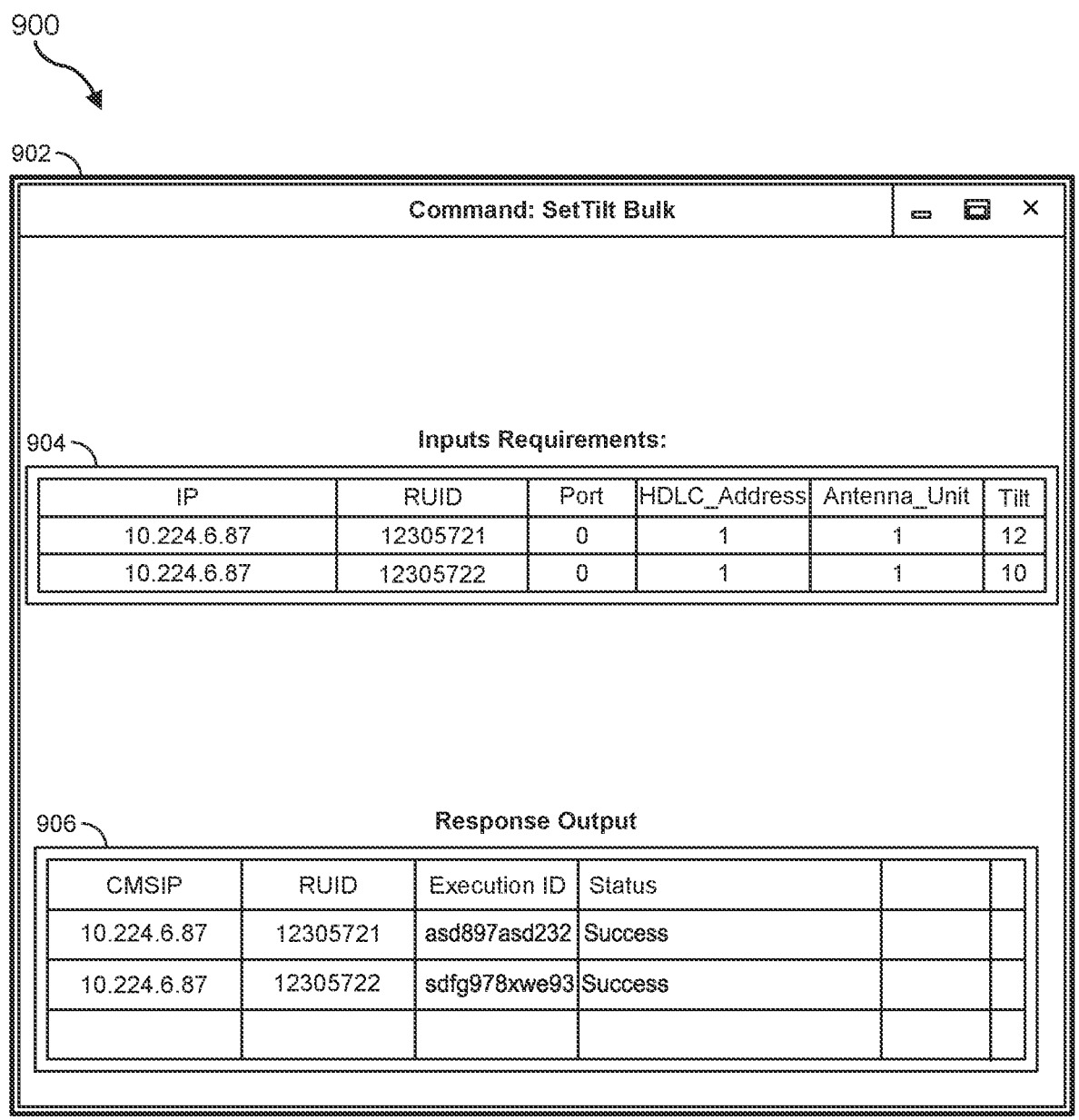
FIG. 9 shows an example graphical user interface for executing an antenna tilt value setting command in bulk.

FIG. 9 shows another example graphical user interface 900, including a primary window 902, corresponding to a specific Remote Electrical Tilt command type for setting the tilt values for different respective antennas in a batch or bulk mode. Graphical user interface 900 substantially parallels graphical user interface 800, with one exception that this command type (i.e., "SetTilt Bulk") further accepts as an input a tilt value. A window 906 further indicates responsive output, including an execution identifier for a historical command execution (i.e., execution of the "SetTilt Bulk" command per the input in window 904), as well as an indication of status in response to that execution. In this illustrative example, both instances of the historical command executions resulted in successful adjustment of the respective antenna tilts according to the tilt values specified within window 904.

Figure 10:
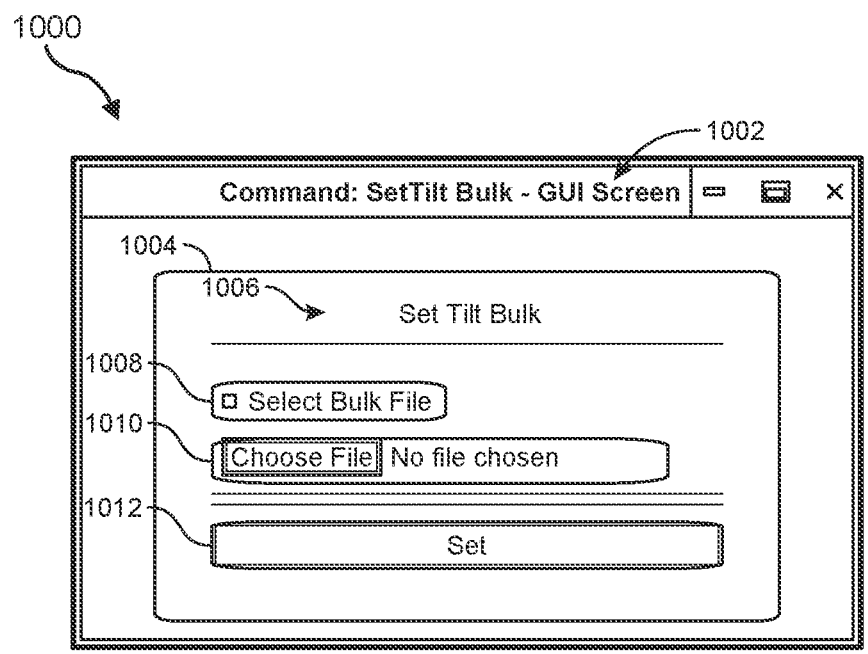
FIG. 10 shows an example graphical user interface for inputting a spreadsheet for executing Remote Electrical Tilt commands in bulk.

FIG. 10 shows an illustrative graphical user interface 1000 including a header 1002 and a window 1004. Graphical user interface 1000 is a simplified example, for illustrative purposes, indicating how a user or administrator may select a particular input configuration file (see FIG. 4), while also appropriately populating the fields of this file (as discussed above in connection with FIGS. 5-6 and FIGS. 8-9). A text indicator 1006 may specify to the user the nature or the type of the command being executed according to the bulk file that is selected. A prompt 1008 may prompt the user to select a particular file, which can be enabled through a user interface element 1010. Upon selecting a particular file, the user or administrator may toggle a button 1012, or other user interface element, to finalize the issuance of the command according to the parameters specified within the particular file selected.

Figure 11:
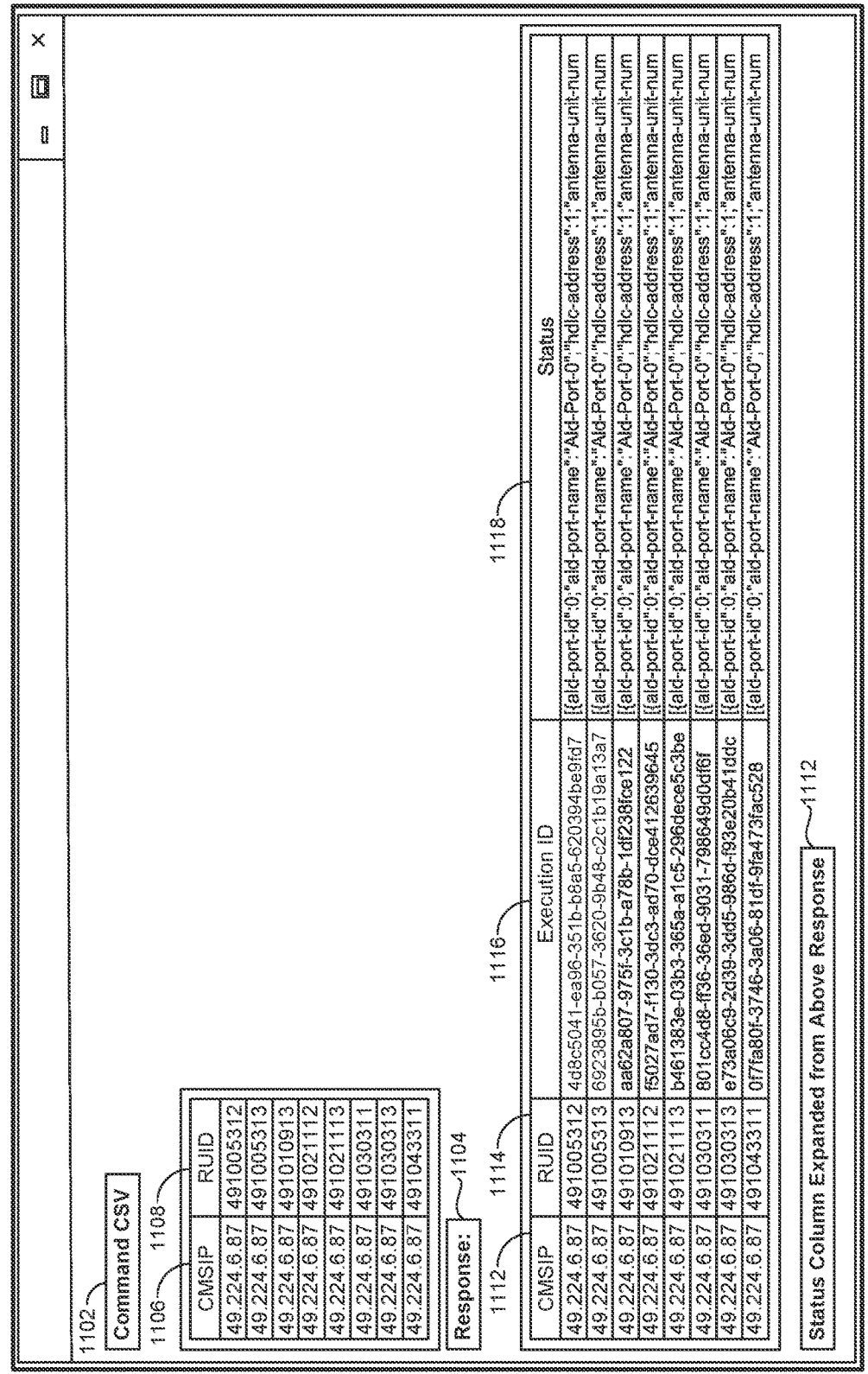

FIGS. 11-12 show more comprehensive examples of Remote Electrical Tilt commands and responses. These figures may correspond to the GetAllInfo command that is further discussed above in detail regarding FIG. 5. As further shown in FIG. 11, within a graphical user interface 1100, an indicator 1102 may identify a file, such as a, separated values file, for issuing such a command. The particular command may be formatted according to columns 1106 and 1108. An indicator 1104 may identify the corresponding response, which repeats these two columns as columns 1112 and 1114, resulting in a column 1116, which identifies a command execution identifier, and a column 1118, which identifies a corresponding status. In particular, column 1118 may identify a port identifier, a port name, an HDLC address, and an antenna unit number, for example.

Additionally, for completeness, FIG. 12 shows a graphical user interface 1200 which may further show an illustrative example of a more complete responsive status 1202 (i.e., corresponding to one of the cells shown in column 1118, but expanded to the end of the respective cell), which identifies additional items of information, as further shown in this figure. These items of information may include a device type, vendor code, product number, a software version, a hardware version, sector ID, and installer ID, a base station ID, an antenna bearing, a mechanical tilt, a frequency band, an antenna-serial-number, an antenna model-number, a maximum tilt, a current tilt, an alarm status, and an alarm description, as further shown in this figure.

FIG. 12 also shows an illustrative example of a failed response, as indicated by indicator 1204. The response may include a column 1206 and a column 1210, which may correspond to inputs, as further discussed above. Additionally, the response may include a column 1212 and a column 1214, where column 1214 indicates the status corresponding to a failed response (e.g., as indicated by the text "RU is not conn[ected] [ . . . ]" An indicator 1216 also identifies a completed version of the first (only) cell shown in column 1214, which further illustrates the items of information returned as part of the failed response.

Figure 13:
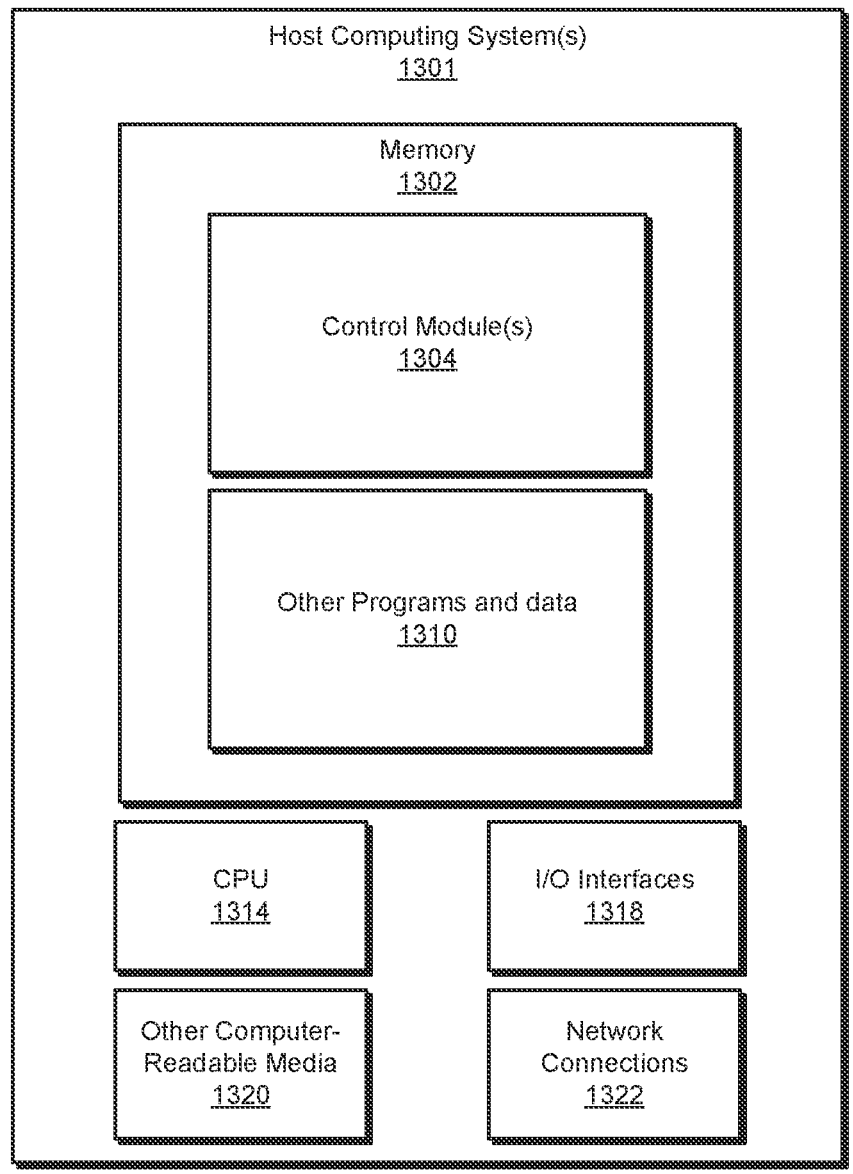
FIG. 13 shows an example computing system that may be configured to execute one or more instances of functionality described herein.

FIG. 13 shows a system diagram that describes an example implementation of a computing system(s) for implementing embodiments described herein. The functionality described herein for bulk issuance of Remote Electrical Tilt related commands can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 13 illustrates an example of underlying hardware on which such software and functionality may be hosted and/or implemented.

In particular, shown is example host computer system(s) 1301. For example, such computer system(s) 1301 may execute a scripting application, or other software application, to perform method 100, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 1301 may include memory 1302, one or more central processing units (CPUs) 1314, I/O interfaces 1118, other computer-readable media 1320, and network connections 1322.

Memory 1302 may include one or more various types of non-volatile and/or volatile storage technologies. Examples of memory 1302 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 1302 may be utilized to store information, including computer-readable instructions that are utilized by CPU 1314 to perform actions, including those of embodiments described herein.

Memory 1302 may have stored thereon control module(s) 1304. The control module(s) 1304 may be configured to implement and/or perform some or all of the functions of the systems or components described herein for bulk issuing of Remote Electrical Tilt related commands. Memory 1302 may also store other programs and data 1310, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 1322 are configured to communicate with other computing devices to facilitate the functionality described herein. In various embodiments, the network connections 1322 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1318 may include a video interface, other data input or output interfaces, or the like. Other computer-readable media 1320 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
receiving multiple Remote Electrical Tilt related commands that are directed to different respective antennas;
aggregating the multiple Remote Electrical Tilt related commands together as a batch; and
executing a script to issue the multiple Remote Electrical Tilt related commands as the batch such that the multiple Remote Electrical Tilt related commands are applied to the different respective antennas;
wherein:
the multiple Remote Electrical Tilt related commands comprise antenna-specific commands for adjusting a tilt of a respective one of the different respective antennas; and
each one of the different respective antennas is served by a radio unit of one or more cellular base stations.

2. The method of claim 1, wherein the multiple Remote Electrical Tilt related commands have the same command type that is one of: a command type to retrieve response information in bulk for all radio units within a set, a command type to retrieve response information in bulk for specific previous executions of commands, a command type to calibrate radio units in bulk, a command type to set antennas tilt orientation in bulk, a command type to set an antenna sector identifier in bulk, a command type to set a base station identifier in bulk, a command type to set an installation date in bulk, a command type to set an installer identifier in bulk, a command type to set a mechanical tilt in bulk, and a command type to set an antenna bearing in bulk.

3. The method of claim 2, wherein the command type accepts as inputs a configuration management system Internet Protocol address and a radio unit identifier.

4. The method of claim 1, wherein a command type of the multiple Remote Electrical Tilt related commands accepts as an input an identifier of a previous execution of a Remote Electrical Tilt related command or accepts as input a port number, a HDLC address, and an antenna unit identifier.

5. The method of claim 4, wherein the command type further accepts as an input a tilt value.

6. The method of claim 1, further comprising issuing a second set of multiple Remote Electrical Tilt related commands as a second batch.

7. The method of claim 1, wherein issuing Remote Electrical Tilt related commands is repeated iteratively until all targeted radio units produce a response.

8. The method of claim 1, wherein the script accepts as input a spreadsheet and produces responsive output into a row or column of the spreadsheet.

9. A non-transitory computer-readable medium encoding computer-executable instructions that, when executed by at least one physical processor of a computing device, cause the computing device to perform a method comprising:
receiving multiple Remote Electrical Tilt related commands that are directed to different respective antennas;
aggregating the multiple Remote Electrical Tilt related commands together as a batch; and
executing a script to issue the multiple Remote Electrical Tilt related commands as the batch such that the multiple Remote Electrical Tilt related commands are applied to the different respective antennas;
wherein:
the multiple Remote Electrical Tilt related commands comprise antenna-specific commands for adjusting a tilt of a respective one of the different respective antennas; and
each one of the different respective antennas is served by a radio unit of one or more cellular base stations.

10. The non-transitory computer-readable medium of claim 9, wherein the multiple Remote Electrical Tilt related commands have the same command type that is one of: a command type to retrieve response information in bulk for all radio units within a set, a command type to retrieve response information in bulk for specific previous executions of commands, a command type to calibrate radio units in bulk, a command type to set antennas tilt orientation in bulk, a command type to set an antenna sector identifier in bulk, a command type to set a base station identifier in bulk, a command type to set an installation date in bulk, a command type to set an installer identifier in bulk, a command type to set a mechanical tilt in bulk, and a command type to set an antenna bearing in bulk.

11. The non-transitory computer-readable medium of claim 10, wherein the command type accepts as inputs a configuration management system Internet Protocol address and a radio unit identifier.

12. The non-transitory computer-readable medium of claim 9, wherein a command type of the multiple Remote Electrical Tilt related commands accepts as an input an identifier of a previous execution of a Remote Electrical Tilt related command.

13. The non-transitory computer-readable medium of claim 12, wherein the command type further accepts as an input a tilt value.

14. The non-transitory computer-readable medium of claim 9, wherein the method further comprises issuing a second set of multiple Remote Electrical Tilt related commands as a second batch.

15. The non-transitory computer-readable medium of claim 9, wherein the method further comprises issuing Remote Electrical Tilt related commands in repetition iteratively until all targeted radio units produce a response.

16. A system comprising:
at least one computing processor configured to execute instructions stored in a non-transitory computer-readable medium;
a radio unit;
a configuration management system operable to adjust an antenna tilt at the radio unit; and
a scripting application interfacing with the configuration management system, wherein the scripting application is configured to execute a method comprising:
receiving multiple Remote Electrical Tilt related commands that are directed to different respective antennas;
aggregating the multiple Remote Electrical Tilt related commands together as a batch; and
executing a script to issue the multiple Remote Electrical Tilt related commands as the batch such that the multiple Remote Electrical Tilt related commands are applied to the different respective antennas:
wherein:
the instructions stored in the non-transitory computer-readable medium instruct the at least one computing processor to perform the method;

the multiple Remote Electrical Tilt related commands comprise antenna-specific commands for adjusting a tilt of a respective one of the different respective antennas; and each one of the different respective antennas is served by a radio unit of one or more cellular base stations.

17. The system of claim 16, wherein the multiple Remote Electrical Tilt related commands have the same command type that is one of: a command type to retrieve response information in bulk for all radio units within a set, a command type to retrieve response information in bulk for specific previous executions of commands, a command type to calibrate radio units in bulk, a command type to set antennas tilt orientation in bulk, a command type to set an antenna sector identifier in bulk, a command type to set a base station identifier in bulk, a command type to set an installation date in bulk, a command type to set an installer identifier in bulk, a command type to set a mechanical tilt in bulk, and a command type to set an antenna bearing in bulk.

18. The system of claim 17, wherein the command type accepts as inputs a configuration management system Internet Protocol address and a radio unit identifier.

\* \* \* \* \*